Patented Dec. 2, 1947

2,431,783

UNITED STATES PATENT OFFICE

2,431,783

SOLUTIONS OF A SYNTHETIC LINEAR POLY-CARBONAMIDE IN A PHENOL CONTAINING ALKALINE MATERIAL

William Way Watkins, Buffalo, N. Y., assignor to E. I. du Pont de Nemours & Company, Wilmington, Del., a corporation of Delaware No Drawing. Application January 22, 1944, Serial No. 519,337

1 Claim. (Cl. 260—29)

This invention relates to the production of transparent structures from a solution of a synthetic linear polyamide. More particularly, it relates to the production of clear, transparent structures from a solution of a synthetic linear polyamide in a phenol.

The term "synthetic linear polyamide" as used throughout the specification and claims is intended to refer specifically to the polyamides disclosed in Carothers U. S. Patents Nos. 2,071,250, 2,071,253 and 2,130,948 which have a high molecular weight and are capable of being cold-drawn into fibers showing, by characteristic X-ray patterns, molecular orientation along the fiber axis. These polyamides can be obtained by self-polymerization of monoaminomonocarboxylic acids, or by reacting a diamine with a dibasic carboxylic acid in substantially equimolecular amounts. Generally speaking, these synthetic linear polyamides comprise the reaction product of a polyamide-forming composition in which the molecules are bifunctional and contain two amide-forming groups, each of which is complementary to an amide-forming group in other molecules in said composition.

The synthetic linear polyamides are generally insoluble in common organic solvents, but they are soluble in phenols as is clearly indicated in the above-mentioned patents. As is also mentioned in these patents, phenol solutions of the synthetic linear polyamides may be formed into yarns, films and other structures and the phenol solvent removed therefrom by evaporation. Structures formed in this manner from phenol solutions of synthetic linear polyamides are, however, objectionably translucent or cloudy in appearance.

U. S. Patent No. 2,141,169 to Catlin discloses a similar process for producing clear, transparent structures from formic acid solutions of synthetic linear polyamides containing hydrogen chloride. The use of hydrogen chloride for this purpose, however, is somewhat unsatisfactory in that care must be taken to avoid hydrolysis of the polyamide. Formic acid solutions of synehtic linear polyamides which contain hydrogen chloride must be used soon after they are prepared.

It is therefore an object of this invention to provide an improved process for forming clear, transparent structures from synthetic linear polyamides by the employment of phenol solutions of these polyamides.

It is another object of this invention to provide an agent which may be added to a phenol solution of a synthetic linear polyamide which agent will impart to the solution the property of forming clear, transparent structures.

Other objects of the invention will appear hereinafter.

In accordance with the present invention, the above objects may be accomplished by admixing with a phenol solution of a synthetic linear polyamide an alkaline material taken from the group consisting of alkali metal hydroxides, alkaline earth metal hydroxides, alkali metal carbonates, alkali metal phenoxides, alkaline earth metal phenoxides and quaternary ammonium hydroxides, forming an article from said solution, and evaporating the solvent from said article.

The following detailed examples are given to illustrate preferred processes for carrying out the invention, it being understood that the specific details set forth in these examples are for illustrative purposes and they are not to be taken as limitations to the invention. Unless otherwise stated, parts referred to in the examples are parts by weight.

Example I

Fifteen parts of polyhexamethylene adipamide having an intrinsic viscosity of 1.69 (intrinsic viscosity based on the definition in Patent No. 2,130,948) are dissolved in 50 parts of 88% phenol and to this solution is added, with stirring, one part of sodium hydroxide in finely divided form. After the sodium hydroxide is completely dissolved, the solution is spread on a glass plate with the aid of a doctor knife. The glass plate is heated at a temperature of 100° C., for a period of one hour which brings about the evaporation of the phenol. The clear, transparent film thus formed on the glass plate is removed by immersion of the plate in water. The film, besides being clear and transparent, is tough, flexible and strong. A similar film produced without the presence of the NaOH in the solution was hazy and translucent.

Example II

A similar clear, transparent, tough, flexible film was produced by substituting polyhexamethylene sebacamide for the polyhexamethylene adipamide of Example I.

Example III

Twenty parts of polyhexamethylene adipamide having an intrinsic viscosity of 1.38 are dissolved in 30 parts anhydrous phenol, and to this solution is added a sufficient quantity of saturated solution of barium hydroxide in water to contain two parts of barium hydroxide. The resulting solution is spun in a "dry spinning" apparatus comprising a brass tube holding a spinneret which is attached to an electrically heated drying cell 6 feet in length and having a cross-section of 7 inches square. The cell has an orifice at the bottom through which the spun filaments are removed and wound on a motor driven drum. A downward current of air is maintained in the cell during the spinning operation. The solution, maintained at a temperature of 125° C., is extruded through the spinneret under a pressure of 50 pounds. The spinning cell temperature is 180° C.

The resulting filaments are clear and transparent whereas similar filaments spun without the presence of barium hydroxide in the above solution resulted in the production of cloudy filaments.

*Example IV*

A film is prepared in accordance with the details set forth in Example I except that 1½ parts of sodium carbonate are substituted for the sodium hydroxide of Example I. In this, case it will be necessary to filter the resulting insoluble precipitate from the solution before casting the film. The resulting film is clear and transparent and has the other desirable properties of the film described in Example I.

*Example V*

A film is prepared in accordance with Example I except that 1½ parts of benzyl trimethyl ammonium hydroxide are substituted for the sodium hydroxide of Example I. Substantially the same results are obtained as set forth in Example I.

The present invention is applicable to all known phenol solutions of synthetic linear polyamides, for example solutions of polyamides in phenol, cresol and xylenol.

This invention has particular utility in the production of polyamide structures from synthetic linear polyamides which are not soluble in ethyl alcohol since ethyl alcohol solutions of the polyamide are not subject to the above-described transparency deficiencies of phenol solutions. The invention, is, however, applicable to phenol solutions of ethyl alcohol-soluble polyamides.

Synthetic linear condensation polyamides of the kind mentioned above are in general useful for the practice of this invention and can be converted into transparent structures in a manner similar to that described in the specific examples. A valuable class of polyamides for the preparation of transparent films are those derived from diamines of the formula NH$_2$CH$_2$RCH$_2$NH$_2$ and dicarboxylic acids of the formula

HOOCCH$_2$R'CH$_2$COOH or their amide-forming derivatives, in which R and R' are divalent hydrocarbon radicals free from olefinic and acetylenic unsaturation and in which R has a chain length of at least two carbon atoms. An especially valuable group of polyamides within this broad class are those in which R is (CH$_2$)$_x$ and R' is (CH$_2$)$_y$, wherein $x$ and $y$ are integers and $x$ is at least 2. As examples of polyamides which might fall within one or both of these groups might be mentioned polytetramethylene adipamide, polytetramethylene suberamide, polytetramethylene sebacamide, polypentamethylene adipamide. polypentamethylene sebacamide, polyhexamethylene adipamide, poly-hexamethylene sebacamide, polyoctamethylene adipamide, polydecamethylene adipamide, polydecamethylene p-phenylene diacetamide, and poly-p-xylylene sebacamide. This invention is not limited, however, to the use of polyamides of the diamine-dibasic acid type; those prepared from polymerizable monoaminomonocarboxylic acids or their amide-forming derivatives are also readily obtained in the form of transparent films by the method herein described. As examples of this type of polyamide might be mentioned, the polymers derived from 7-aminoheptoic acid, 9-amino-nonanoic acid, and 11-amino-undecanoic acid. It is within the scope of this invention to prepare transparent structures from mixtures of preformed polyamides as well as from interpolymers, i. e., polymers derived from a mixture of polyamide-forming reactants, e. g., a mixture of two diamines with one or more dicarboxylic acids, or a mixture of a diamine and a dicarboxylic acid with a polymerizable monoaminomonocarboxylic acid.

Th alkaline material used, in accordance with the present invention to produce transparent structures, may be incorporated in the phenol solutions in any desired manner. For example, they may be added in finely divided form or in alcohol or water solutions, or they may be formed in situ in the solution from materials which will produce the same.

As above indicated, the alkaline material may be an alkali metal hydroxide, an alkaline earth metal hydroxide, an alkali metal carbonate, an alkali metal phenoxide, an alkaline earth metal phenoxide or a quaternary ammonium hydroxide. The preferred materials are alkali metal hydroxides in view of their excellent solubility and cheapness. The more soluble alkaline materials are more readily utilized than the less soluble materials. For example, in using sodium carbonate as the transparentizing agent, an insoluble precipitate is formed when it is added to a solution containing phenol. It is therefore necessary to filter out the precipitate before the solution can be cast to form a transparent film. Preferably, the alkaline material should have a solubility of at least 10%, by weight, in water.

The folowing list of specific compounds is given to illustrate the operativeness of the several types of alkaline materials set forth above.

Alkali metal hydroxides:
 Sodium hydroxide
 Potassium hydroxide
 Lithium hydroxide
Alkaline earth metal hydroxides:
 Magnesium hydroxide
 Calcium hydroxide
 Barium hydroxide
 Strontium hydroxide
Alkali metal phenoxides:
 Sodium phenoxide
 Potassium phenoxide
Alkaline earth metal phenoxides:
 Magnesium phenoxide
 Calcium phenoxide
 Barium phenoxide
 Strontium phenoxide
Alkali earth metal carbonates:
 Sodium carbonate
 Potassium carbonate
Quaternary ammonium hydroxides:
 Benzyl trimethyl ammonium hydroxide
 Octyl pyridinium hydroxide Dodecyl pyridinium hydroxide
Octadecyl pyridinium hydroxide
Dodecyl triethyl ammonium hydroxide
Hexadecyl triethyl ammonium hydroxide
Benzene azophenyl trimethyl ammonium hydroxide
Isopropyl naphthyl trimethyl ammonium hydroxide Preferably, the alkaline material is present in the solution in an amount between 3% and 15% based on the weight of the polyamide. Other proportions will, however, be operative to produce the transparency in the resultant article as above set forth.

The alkaline material may be left in the article or structure obtained by the evaporation of the solvent. However, it is preferred that the structure or article be washed, for example with water, to remove the alkaline material.

This invention provides a satisfactory and cheap process for the preparation of clear, transparent structures from phenol solutions of synthetic linear polyamides. Transparent films produced in accordance with the invention are satisfactory for use as wrapping tissue or for ornamental purposes. They may be used as a leather substitute or as an interlayer in the production of safety glass or other laminated structures.

Since many changes and modifications can be made in the above described details without departing from the nature and spirit of the invention, it is to be understood that the invention is not to be limited to these details except as set forth in the appended claim.

I claim:

A structure-forming solution comprising a synthetic linear polycarbonamide wherein the average number of carbon atoms in the segments of the chain separating the amide groups is at least two, a phenol, and between 3% and 15% based on the weight of the polycarbonamide of an alkaline material taken from the group consisting of alkali metal hydroxides, alkaline earth metal hydroxides, alkali metal carbonates, alkali metal phenoxides, alkaline earth metal phenoxides and quaternary ammonium hydroxides.

WILLIAM WAY WATKINS.

REFERENCES CITED

The following references are of record in the file of this patent:

UNITED STATES PATENTS

| Number | Name | Date |
|---|---|---|
| 2,130,948 | Carothers | Sept. 20, 1938 |
| 2,071,253 | Carothers | Feb. 16, 1937 |